United States Patent
Bae et al.

(10) Patent No.: US 8,101,141 B2
(45) Date of Patent: Jan. 24, 2012

(54) UNIFIED FUEL PROCESSING REACTOR FOR SOLID OXIDE FUEL CELL

(75) Inventors: Joongmyeon Bae, Daejeon (KR); Sangho Yoon, Daejeon (KR); Sunyoung Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 454 days.

(21) Appl. No.: 12/429,233

(22) Filed: Apr. 24, 2009

(65) Prior Publication Data
US 2010/0104899 A1    Apr. 29, 2010

(30) Foreign Application Priority Data
Oct. 27, 2008    (KR) .................. 10-2008-0105272

(51) Int. Cl.
*B01J 8/00*    (2006.01)
*B01J 10/00*    (2006.01)

(52) U.S. Cl. ........ 422/629; 422/625; 422/628; 422/630; 422/631; 422/634; 422/636; 422/644; 48/127.9; 48/127.1; 48/198.3; 48/198.6; 48/198.7; 423/650; 423/651; 423/652; 423/653; 423/654; 429/19; 429/20

(58) Field of Classification Search .................. 422/629, 422/190–191, 194–195, 197, 200–203, 211; 48/127.9; 423/650–654
See application file for complete search history.

(56) References Cited

U.S. PATENT DOCUMENTS
6,793,698 B1 * 9/2004 Sanger et al. ................ 48/127.9
2007/0089368 A1 * 4/2007 Grieve et al. ................ 48/197 R
2007/0092766 A1    4/2007 England et al.

FOREIGN PATENT DOCUMENTS
JP    2006-351292    12/2006
JP    2006-351293    12/2006

* cited by examiner

*Primary Examiner* — Kaity V. Handal
(74) *Attorney, Agent, or Firm* — Lowe Hauptman Ham & Berner, LLP

(57) ABSTRACT

A unified fuel processing reactor for a solid oxide fuel cell can reform hydrocarbon-based fuel into hydrogen-rich gas, remove a sulfur component, and convert non-converted fuel and a low carbon ($C_2$~$C_5$) hydrocarbon compound into hydrogen and methane in a single reactor. The reactor comprises a primary-reformer which reforms a hydrocarbon-base fuel and generates hydrogen-rich reformed gas, a desulfurizer which removes a sulfur component from the reformed gas, and a post-reformer which selectively decomposes a low carbon ($C_2$~$C_5$) hydrocarbon in the desulfurized reformed gas into hydrogen and methane. The primary-reformer, desulfurizer and post-reformer are in the unified reactor and isolated, except for a fluid passage, from each other by internal partition walls. The primary-reformer is disposed at a center portion of the reactor. The post-reformer and the desulfurizer are concentrically disposed outside of the primary-reformer.

4 Claims, 6 Drawing Sheets

UNIFIED FUEL PROCESSING REACTOR FOR SOLID OXIDE FUEL CELL

RELATED APPLICATION

The present application is based on, and claims priority from, KR Application Number 10-2008-0105272, filed Oct. 27, 2008, the disclosure of which is hereby incorporated by reference herein in its entirety.

TECHNICAL FIELD

The present invention relates to a unified fuel processing reactor for a solid oxide fuel cell, and particularly, to a unified fuel processing reactor for a solid oxide fuel cell, which can reform hydrocarbon-based fuel into hydrogen-rich gas; remove a sulfur component; and convert non-converted fuel and a low carbon ($C_2$~$C_5$) hydrocarbon compound into hydrogen and methane in a single reactor, thereby improving stability over a long period and allowing a thermally independent operation and also miniaturizing a fuel cell system.

BACKGROUND ART

Industrial development and population growth has rapidly increased the demand for energy around the world. However, it has been estimated that production of oil and natural gas as main energy sources will be gradually reduced starting the year 2020. Therefore, research and development on alternative clean energy sources is required for the drain on fossil fuel resources.

As the Kyoto protocol aiming for limiting greenhouse gas emissions had been adopted in the year 1997 and ratified in 119 countries including Korea, the countries have agreed to control and/or reduce emission of greenhouse gases in the atmosphere.

Various technologies using clean natural resources such as solar energy, wind force and hydrogen energy has been studied and developed. Recently, SOFC (Solid Oxide Fuel Cell) technology comes into the spotlight as a clean energy because of reasons as follows:

1) Since it uses a method of direct generation of electric power which is not necessary for combustion processes and mechanical actions unlike in existing thermal power generation, it is not limited thermodynamically (Carnot efficiency), it has a high electric power generation efficiency of 40~60% and also it has a substantially constant efficiency over a wide load range, e.g., 25~100% of rated power. 2) It does not exhaust NOx, SOx and the like and can reduce $CO_2$ emissions of 30% or more, and it is an eco-friendly technology that its operation noise/vibration is very immaterial. 3) It can use a method of distributed generation of electric power and thus it can directly generate and supply the electric power at home and in an industrial site. Therefore, a power transmission/distribution system is not needed. 4) Since its power generation capacity can be facilely adjusted, it can be used as a middle/large-scaled power generation system of 100 kW~a few tens MW class, a small-scaled home power generation system of 1 kW~10 kW class and a mobile power generation system of a few W~a few kW class.

The SOFC is an energy conversion device in which chemical energy of fuel gas is directly converted into electric energy by an electrochemical reaction. According to the electrochemical reaction of the SOFC, in a fuel electrode, hydrogen releases electrons and reacts with oxygen ions moved through an electrolyte to generate water and heat. The electrons generated in the fuel electrode move to an air electrode while generating direct current, and combines with oxygen in the air electrode to generate oxygen ions. The generated oxygen ions move through the electrolyte to the fuel electrode.

A potential difference obtained from one basic unit cell comprised of the fuel electrode, the electrolyte and the air electrode is about 1V. Accordingly, in order to use the fuel cell as a power source, it is necessary to construct a fuel cell system having a fuel cell stack in which a plurality of unit cells are connected in series or parallel with each other.

A typical fuel cell system includes a SOFC stack for generating electric power, a fuel processing device for supplying hydrogen/hydrocarbon and oxygen to the stack, a power conversion system for converting DC power generated from the SOFC stack into AC power, and a heat recovery device for recovering heat generated from the SOFC.

According to a used electrolyte material, the fuel cell can be classified into an alkaline fuel cells (AFC), a phosphoric acid fuel cell (PAFC), a polymer electrolyte membrane cells (PEMFC), a molten carbonate fuel cell (MCFC), and a solid oxide fuel cell (SOFC). In case of the PEMFC, the most particular fuel processing method is required. And in case of SOFC, fuel can be sufficiently processed by internal reforming in a stack.

The fuel reforming in the fuel cell is to convert fuel provided as a raw material into fuel required for the stack.

In the PEMFC, after performing a desulfurization process which removes a sulfur component from natural gas, a reforming process which generates hydrogen is performed. Then, a water shift reaction for removing CO generated in the reforming process and a selective oxidation reaction are additionally performed, and a CO concentration should be controlled to be not more than 100 ppm by the water shift reaction. However, in the SOFC, since CO itself can be used as a fuel, the fuel can be sufficiently processed only by the internal reforming using catalytic materials provided in the fuel cell stack. Further, since the SOFC is operated at a high temperature, it can use CH4 as well as CO as the fuel.

The table 1 described below shows available fuels, conductive ion materials, fuel reforming methods and technical problems according to the kinds of fuel cells.

TABLE 1

| | Fuel cell | | | | |
|---|---|---|---|---|---|
| | MCFC | SOFC | PAFC | PEMFC | DMFC |
| Operation temperature (° C.) | 550~700 | 600~1000 | 150~250 | 50~100 | 50~100 |
| Ion | $CO_3^{2-}$ | $O^{2-}$ | $H^+$ | $H^+$ | $H^+$ |
| Available fuel | $H_2$, CO | $H_2$, CO, methane | $H_2$, methanol | $H_2$ | methanol |
| External reformer | unnecessary | unnecessary | necessary | necessary | necessary |
| problem | Corrosion, volatilization | High temperature deterioration, stability | Corrosion, Leak of phosphoric acid | High expense, low efficiency | High expense, methanol crossover |

As shown in Table 1, in case of the PAFC, the PEMFC and the DMFC which are low temperature fuel cells using a platinum-based catalyst, it is necessary to reduce and limit the CO concentration contained in a reformed gas using an external reformer so as to prevent deterioration of the catalyst. However, in case of the MCFC and the SOFC which uses a nickel-based catalyst, since it is possible to use the CO as fuel, it is not necessary to remove the CO, and also since a reforming reaction can occur in a fuel electrode containing nickel (internal reforming), the external reformer is not needed.

Generally, a water vapor reforming using the nickel catalyst is used to reform hydrocarbon-based fuel. In other words, the reforming reaction is to react the hydrocarbon-based gas with the water vapor under the nickel catalyst and thus to generate CO and $H_2$. Since the reforming reaction is an endothermic reaction, it is necessary to supply heat from an outside.

A partial oxidation reforming which reacts the hydrocarbon-based gas with oxygen so as to generate CO and $H_2$, and an autothermal reforming which combines the water vapor reforming and the partial oxidation reforming can be used besides the partial oxidation reforming.

Then, in case of the low temperature fuel cell which uses the platinum-based catalyst as an electrode catalyst, a shift reaction in which the water vapor is reacted again with CO so as to oxidize CO into $CO_2$ is performed.

If necessary, in order to reduce the CO concentration to 10 ppm or less, the selective oxidation reaction in which CO is selectively oxidized under an atmosphere having a high hydrogen concentration is performed.

As described above, since the SOFC and the MCFC use a nickel-based fuel electrode and are operated at a high temperature, CO can be used as the fuel, and since hydrocarbon can be also used by the internal reforming in the fuel electrode, a fuel reformer for the SOFC can be typically comprised of only a desulfurizer for removing sulfur in the fuel or the desulfurizer and a pre-reformer.

At this time, in case that liquid hydrocarbon is used as the fuel, it is not possible to obtain a sufficient reforming efficiency by only the pre-reformer and the internal reforming in the stack, and thus the fuel reformer for the SOFC is typically comprised of the desulfurizer and the reformer. However, due to the property of the SOFC which is operated at a high temperature, CO and methane contained in hydrogen can be used as fuels, and thus reforming conditions are not strict in general.

As a conventional SOFC system with an external reformer, there has been proposed Japanese Patent Publication No. 2006-351293 which includes a desulfurizer for removing sulfur contained in liquid fuel, an evaporator for forming reforming fuel from the liquid fuel and water, a reformer for generating hydrogen-rich gas from the reforming fuel, and a solid electrolyte SOFC cell.

In Japanese Patent Publication No. 2006-351293, the SOFC system includes a desulfurizing device for removing sulfur contained in hydrocarbon fuel, the reformer for generating the hydrogen-rich gas from the desulfurized hydrocarbon fuel, and the solid electrolyte SOFC cell. Particularly, the desulfurizing device includes a desulfurizer for removing a sulfur compound, a desulfurized fuel tank for storing the desulfurized hydrocarbon fuel and a return passage communicated from the desulfurized fuel tank to the desulfurizer.

There has been also proposed a fuel processing apparatus in U.S. Patent Publication No. 2007-0092766, which includes a liquid phase desulfurizer for partially removing sulfur from liquid phase fuel, a fuel conveying device for vaporizing and conveying the partially desulfurized liquid phase fuel, a gas phase desulfurizer for desulfurizing the vaporized fuel, and a reformer for generating hydrogen-rich gas.

Even in the SOFC system using the liquid fuel, as described above, the main consideration is to efficiently remove the sulfur component. The fuel reforming is just to generate the hydrogen-rich gas using the single reformer.

Further, in the step of reforming the liquid hydrocarbon-based fuel into the fuel which is supplied to the SOFC stack (cell), since each unit part such as the desulfurizer, the evaporator, the reformer and the fuel conveying device is formed as an independent reactor, it is restricted to simplify and miniature the SOFC system.

The present invention provides a method of preventing the high temperature deterioration which is the biggest obstacle to industrialize and commercialize the SOFC and also improving the stability of performance. In other words, since the low carbon ($C_2$~$C_5$) hydrocarbon material, which is not converted in the reformer and is contained in the fuel injected into the SOFC cell (stack), exerts a bed effect on the high temperature deterioration and the stability of performance, a post-reformer for selectively removing the low carbon hydrocarbon is provided to thereby prevent the deterioration of performance of the fuel cell system and maintain the reliability and stability for a long time period. And since the reforming, the sulfuring and the decomposing of the non-converted low carbon ($C_2$~$C_5$) hydrocarbon material are performed in a single reactor, it is possible to increase the stability of the SOFC system and to simplify and miniature the SOFC system, and also it can be thermally independent.

DISCLOSURE OF THE INVENTION

It is an object of the present invention to provide a reactor for processing fuel which is supplied to a solid oxide fuel cell or a solid oxide fuel cell stack, and particularly, to provide a unified fuel processing reactor for a solid oxide fuel cell, which can reform hydrocarbon-based fuel into hydrogen-rich gas; remove a sulfur component; and selectively decompose a non-converted low carbon ($C_2$~$C_5$) hydrocarbon compound in a single reactor, thereby simplifying and miniaturizing a solid oxide fuel cell system, preventing the deterioration of performance of the solid oxide fuel cell (stack) and allowing a thermally independent operation.

To achieve the above object, the present invention provides unified fuel processing reactor for a solid oxide fuel cell, comprising a primary-reformer which reforms a hydrocarbon-base fuel and generates hydrogen-rich reformed gas; a desulfurizer which removes a sulfur component from the reformed gas; and a post-reformer which selectively decomposes a low carbon ($C_2$~$C_5$) hydrocarbon compound contained in the desulfurized reformed gas into hydrogen and methane, wherein the primary-reformer, the desulfurizer and the post-reformer are provided in the unified reactor and also isolated from each other by internal partition walls except a fluid moving passage, and the primary-reformer is disposed at a center portion of the reactor, and the post-reformer and the desulfurizer are concentrically disposed in turn at an outside of the primary-reformer.

In the reactor, an external fluid inlet port for supplying an external fluid into the reactor is provided so that fluid including hydrocarbon-base fuel, water and air is supplied into the reactor through the external fluid inlet port, and the fluid discharged through an internal fluid outlet port is supplied to an SOFC cell (stack).

Preferably, the external fluid inlet port is formed at an upper side of the primary-reformer, and a lower portion of the primary-reformer is communicated with a lower portion of the desulfurizer, and an upper portion of the desulfurizer is communicated with an upper portion of the post-reformer, and a lower portion of the post-reformer is closed by an internal partition wall, and the internal fluid outlet port is formed at a lower side of the post-reformer.

Therefore, the fluid introduced through the external fluid inlet port is reformed into hydrogen-rich gas in the primary-reformed gas, and desulfurized in the desulfurizer, and finally transferred to the post-reformer so that the low carbon hydrocarbon contained in the desulfurized reformed gas is selectively decomposed into hydrogen and methane, and then discharged through the internal fluid outlet port.

Preferably, the reactor is formed into a cylindrical or polyhedral shape, and the primary-reformer has a circular, elliptical or polygonal shape in section. The post-reformer and the desulfurizer respectively have a ring-shape, an elliptical ring-shape and a polygonal band shape.

The reactor can be thermally independent without the external heat. In detail, the post-reformer is heated by reforming reaction heat of the primary-reformer and desulfurizing reaction heat of the desulfurizer.

BEST MODE FOR CARRYING OUT THE INVENTION

Figure 1:
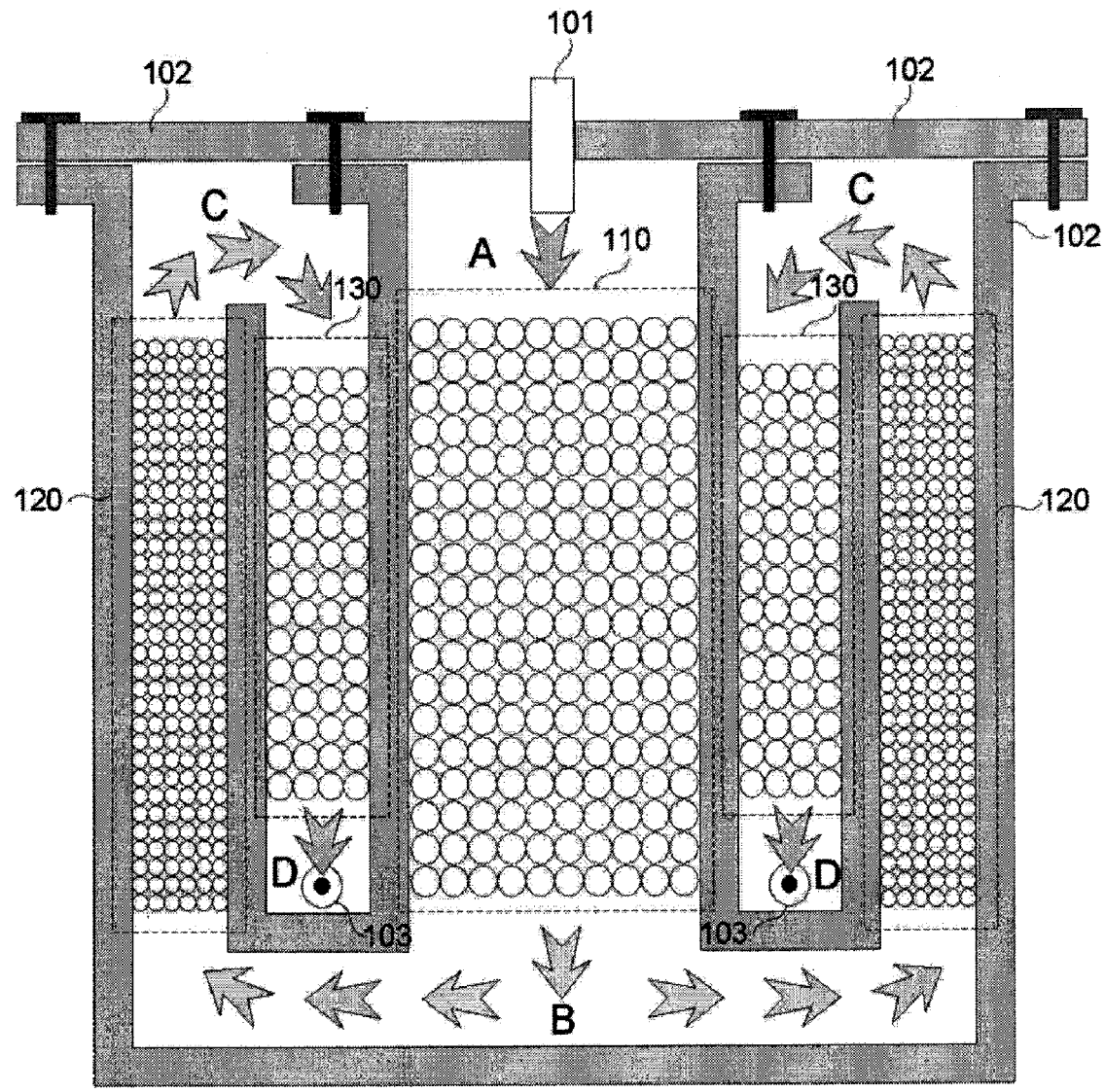
FIG. 1 is a schematic view showing a unified fuel processing reactor for a solid oxide fuel cell according to the present invention.

Hereinafter, the embodiments of the present invention will be described in detail with reference to accompanying drawings. The drawings are just examples for explaining ideas in the present invention, and thus the present invention are not limited to the drawings but can be realized in the form of other type. The same reference numerals are used for the same or similar parts the drawings.

Unless defined otherwise, all technical terms and scientific terms used herein the same means as commonly understood by one of ordinary sill in the art to which this invention belongs, and well-known functions and constructions in the drawings and the description, which may undesirably becloud the subject matters of the present invention, will be omitted.

Hereafter, a post-reformer means that a hydrocarbon-based fuel is desulfurized and reformed into hydrogen-rich gas and then a low carbon hydrocarbon compound contained in the gas is selectively decomposed and converted into hydrogen and methane.

A unified fuel processing reactor for a solid oxide fuel cell (SOFC) according to the present invention is to supply fuel in a SOFC cell or stack, and the fuel to be processed is gas phase or liquid phase hydrocarbon-based fuel. Preferably, the fuel is the liquid phase hydrocarbon-based fuel. At this time, the liquid phase hydrocarbon-based fuel includes kerosene, light oil, naphtha, gasoline and liquefied petroleum gas (LPG).

FIG. 1 is a view showing a unified fuel processing reactor for a SOFC according to the present invention. As shown in FIG. 1, the unified fuel processing reactor of the present invention is a single reactor in which a desulfurizing operation, a reforming operation and a decomposing operation of a low carbon hydrocarbon material are carried out.

In detail, an external fluid inlet port 101 through which hydrocarbon-based fuel, water and air are introduced into the reactor air-tightly closed by a single outer wall 102 is formed at an upper side of a primary-reformer so as to preferably have an injection nozzle. The hydrocarbon-based fuel contained in a mixed reactant (A, hydrocarbon-based fuel, water and air) introduced through the injection nozzle is reformed into hydrogen-rich reformed gas (B) by a primary-reformer 110, and then desulfurized reformed gas (c) is introduced into a post-reformer 130 so that non-converted hydrocarbon-based fuel contained in the desulfurized reformed gas (C), i.e., a low carbon hydrocarbon compound of $C_2 \sim C_5$ is selectively decomposed and converted into methane and hydrogen. And the gas (D) post-reformed in the reactor is discharged through a gas outlet port 103 to an outside of the reactor and then supplied to a SOFC cell/stack.

Referring to FIG. 1, a fluid moving passage in the reactor will be described. Preferably, the external fluid inlet port 101 is formed at the upper side of a primary-reformer 110, a lower portion of the primary-reformer 110 is communicated with a lower portion of the desulfurizer 120, an upper portion of the desulfurizer 120 is communicated with an upper portion of the post-reformer 130, a lower portion of the post-reformer 130 is closed by an internal partition wall, and an internal fluid outlet port is formed at a lower side of the post-reformer 130.

As shown in FIG. 1, the primary-reformer 110 is provided at a center portion of the single reactor, and the primary-reformer 110 is enclosed by the internal partition wall except both corresponding portions of the primary-reformer 110 so that the fluid can be moved. The gas (B) discharged through the primary-reformer 110 is introduced into the desulfurizer 120 which is provided at an outermost portion of the reactor, and the desulfurizer 120 is enclosed by the internal partition wall and an external partition wall except both corresponding portions of the desulfurizer 120 (herein, the external partition wall may be an outer wall of the reactor). The gas (C) discharged from the desulfurizer 120 is introduced into the post-reformer 130 between the primary-reformer 110 and the desulfurizer 120, and the post-reformer 130 is enclosed by the internal partition wall except one part through which the fluid is introduced. The post-reformed gas (D) of the post-reformer 130 is discharged to the outside of the reactor through the gas outlet port 103 provided at one side corresponding to a fluid introduction side of the post-reformer 130.

The heat necessary for the reaction in the post-reformer 130 uses the reaction heat generated in the reformer 110 and the desulfurizer 120 to heat the post-reformer 130, and thus the reaction in the post-reformer 130 can be performed without the external heat.

As shown in FIG. 1, in order for the post-reformer 130 to efficiently use the heat generated in the reactor, it is preferable that the post-reformer 130 is disposed between the reformer 110 and the desulfurizer 120. Also, it is preferable that the primary-reformer 110, the post-reformer 130 and the desulfurizer 120 are concentrically disposed in turn around a center portion of the primary-reformer 110 (or a center portion of the reactor), in detail, around a vertical axis (preferably, the vertical axis of the reactor is coincided with the vertical axis of the primary-reformer 110) of the reformer 110.

After the hydrocarbon-based fuel supplied through the external fluid inlet port 101 is reformed into the hydrogen-rich reformed gas in the primary-reformer 110 disposed at the center portion of the reactor, the reformed gas is supplied to the desulfurizer 120 through the lower portion of the desulfurizer 120 which forms the fluid moving passage with the lower portion of the primary-reformer 110 (i.e., which is communicated with each other). The reformed gas in which a sulfur component is removed in the desulfurizer 120 is introduced into the post-reformer 130 through the upper portion of the desulfurizer 120 which forms the fluid moving passage with the lower portion of the post-reformer 130 (i.e., which is communicated with each other) and then the non-reacted hydrocarbon-based fuel, particularly, the low carbon hydrocarbon compound of $C_2$~$C_5$ remained in the desulfurized reformed gas is converted into hydrogen and methane.

Preferably, the post-reformer 130 has the partition walls at all surfaces thereof except one side which forms the fluid moving passage with the desulfurizer 120. The gas outlet port 103 for discharging the fluid from the reactor to the outside is formed at a corresponding side with the side in which the fluid moving passage of the post-reformer 130 (i.e., through which the fluid is introduced) so that the fluid discharged through the gas outlet port 103 is supplied to the SOFC cell (or stack).

At this time, the low carbon hydrocarbon material of $C_2$~$C_5$ which is selectively decomposed and converted into hydrogen and methane in the post-reformer 130 includes ethylene, acetylene, ethane, propylene, propane and butane.

In conventional case that the hydrogen-rich reformed gas containing the low carbon hydrocarbon material of $C_2$~$C_5$ is supplied to the SOFC cell, carbon deposition occurs in the SOFC cell, thereby reducing an operational efficiency of the SOFC system when it is used for a long time period and also deteriorating the performance and stability of the SOFC system.

The deterioration of performance due to the low carbon hydrocarbon material of $C_2$~$C_5$ raises a further serious problem in the SOFC in which the hydrocarbon-based liquid fuel is reformed. In case of the liquid fuel that a fuel converting (reforming) operation is complicated and difficult, it is very difficult to convert the fuel using only a pre-reformer like in the gas fuel, and also although a reformer as an external reformer is provided, a large amount of non-converted hydrocarbon, i.e., the low carbon hydrocarbon material of $C_2$~$C_5$ is contained in the reformed gas when reforming the liquid fuel, thereby reducing the stability of the fuel cell.

According to the present invention as described above, since the desulfurizing operation, the reforming operation and the post-reforming operation (the post-reforming operation in which the low carbon hydrocarbon materials are converted into hydrogen and methane) are performed in the single reactor of the present invention, it is possible to simplify and miniaturize the SOFC system. And unlike in the conventional method in which the desulfurized and reformed gas is supplied to the SOFC cell, the decomposing reaction (the post-reforming operation) in which the non-reacted hydrocarbon-based fuel, particularly, the low carbon hydrocarbon compound of $C_2$~$C_5$ remained in the desulfurized reformed gas is converted into hydrogen and methane is performed so that the gas containing the low carbon hydrocarbon compound of 10 ppm or less is supplied to the SOFC cell or stack, thereby preventing the deterioration of performance of the SOFC system, particularly, the SOFC cell (stack).

The reactor of the present invention is formed into a cylindrical or polyhedral shape, and the primary-reformer has a circular, elliptical or polygonal shape in section. The post-reformer and the desulfurizer respectively has a ring-shape, an elliptical ring-shape or a polygonal band shape, and the post-reformer and the desulfurizer has a concentric structure in which both ends thereof are connected to form a looped line centering around a center of a section of the primary-reformer.

Figure 2:
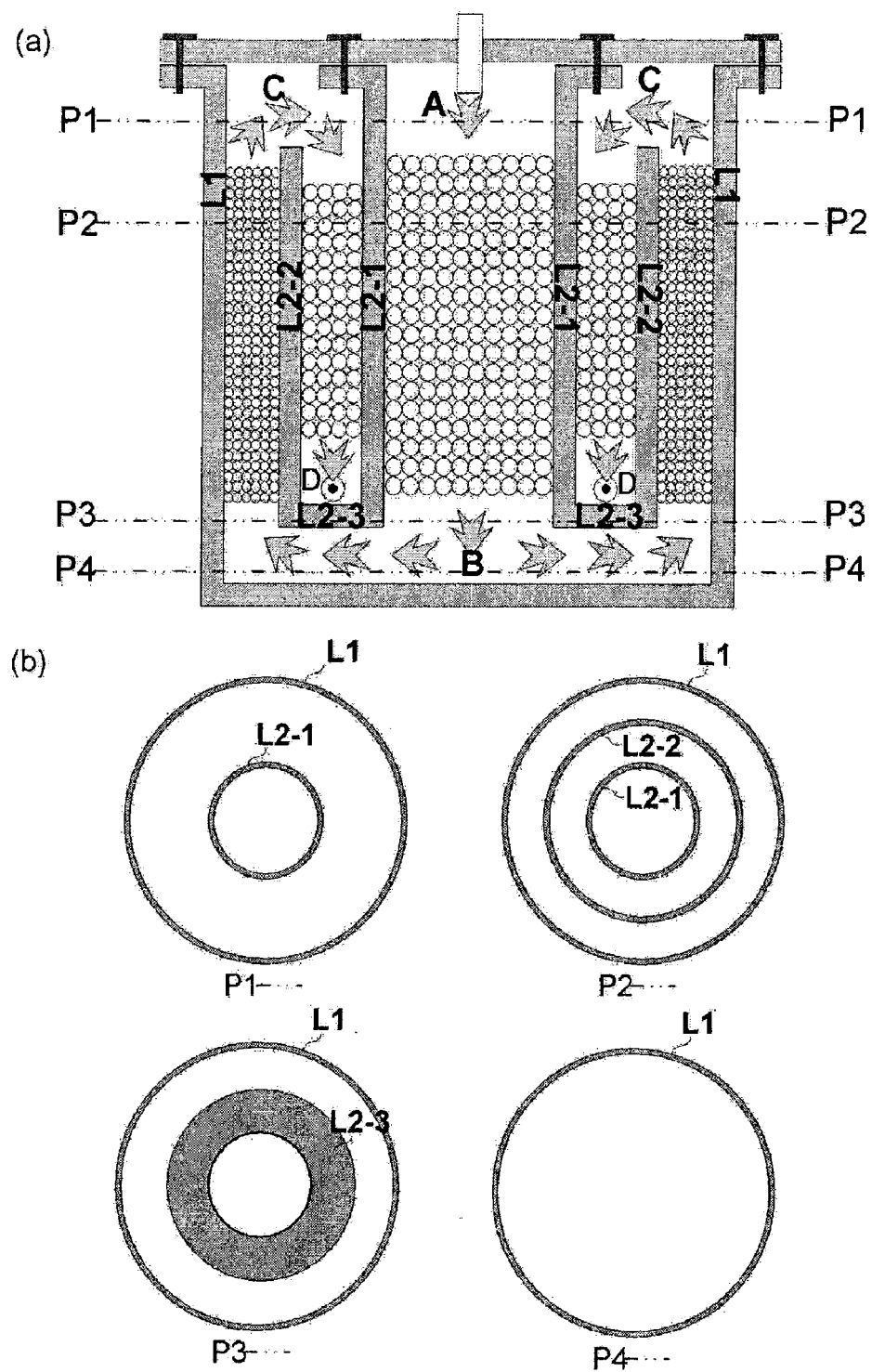
FIG. 2 is a cross-sectional view shown by each height of the unified fuel processing reactor of FIG. 1.
Figure 2:
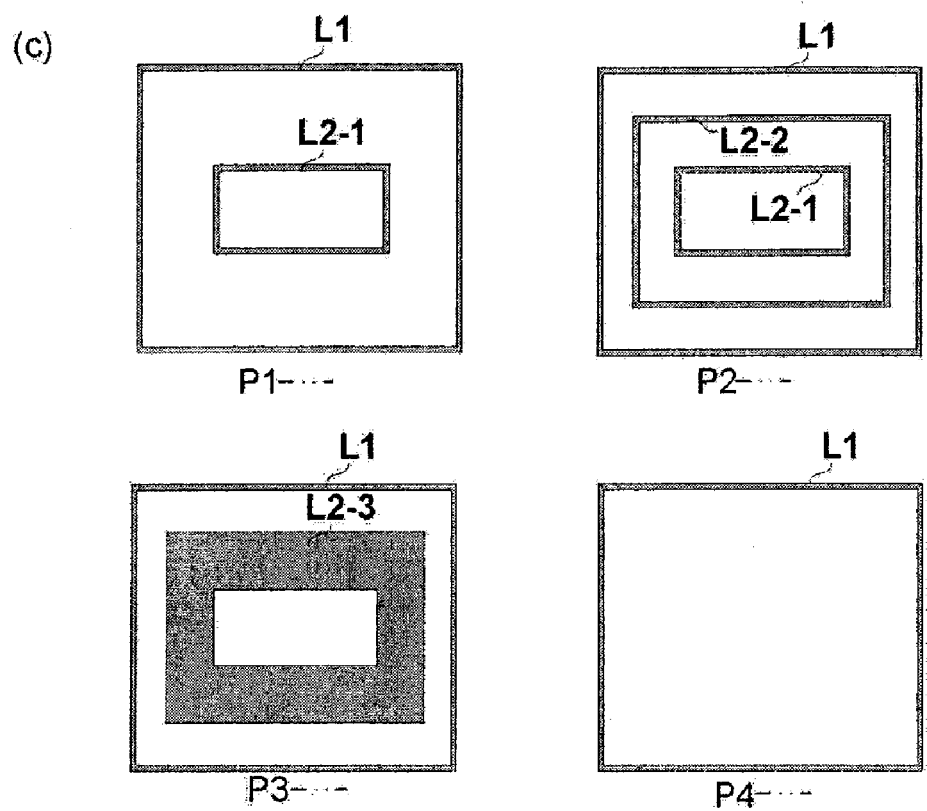

FIG. 2 shows horizontal cross-section views (taken along lines P1-P1~P4-P4) wherein only the internal and external partition walls are illustrated for the sake of convenience.

As shown in FIGS. 2a~2c, the primary-reformer 110 is positioned at a center portion of the horizontal cross-section so as to have the circular, elliptical and polygonal shape in section, and the post-reformer and the desulfurizer respectively and independently can have the ring-shape, the elliptical ring-shape and the polygonal band shape.

As shown in FIG. 2, preferably, the primary-reformer 110, the post-reformer 120 and the desulfurizer 130 are disposed to have the same shape as an inner space divided by the partition walls, thereby efficiently performing the reforming and desulfurizing reactions of the fluid.

In case of the reactor having the cylindrical shape as shown in FIG. 2b, preferably, the primary-reformer having the circular shape in section, the post-reformer having the ring shape in section and the desulfurizer having the ring shape in section are concentrically disposed in turn. In case of the reactor having the hexahedral shape as shown in FIG. 2c, preferably, the primary-reformer having the square shape (rectangular shape in drawing) in section, the post-reformer having the square band shape (rectangular band shape in drawing) in section and the desulfurizer having the square band shape (rectangular band shape in drawing) in section are concentrically disposed in turn.

The internal and external partition walls of the reactor according to the present invention may be formed of any material which has a high durability at a high temperature (about 800° C.) and an excellent heat transfer efficiency and also which is not reacted with the hydrocarbon-base fuel, the reformed gas, the desulfurized reformed gas and the post-reformed gas. However, the internal and external partition walls can be substantially formed of SUS (steel use stainless).

The primary-reformer is provided with a noble metal catalyst so that autothermal reforming reactions among the supplied fuel, water and air can be carried out. The noble metal catalyst preferably includes Pt, Rh, Ru and a mixture thereof.

Preferably, the primary-reformer is formed of a porous support (including a support having through-pores along a fluid conveying direction) through which the fluid is passed and which impregnates the noble metal catalyst. For the sake of facile space filling, the primary-reformer can be formed of support blocks impregnating the noble metal catalyst. Further, And also it is preferable that an amount of the noble metal catalyst impregnated in the support is properly controlled according to a kind of hydrocarbon-based fuel to be reformed, an amount of the supplied fuel and the like.

The desulfurizer is provided with a desulfurizing catalyst so as to perform an adsorption reaction of a sulfur compound with respect to the catalyst, and the desulfurizing catalyst is preferably formed of ZnO. Like the primary-reformer, the desulfurizer is preferably formed of a porous support (including a support having through-pores along a fluid conveying direction) through which the fluid is passed and which impregnates the desulfurizing catalyst. For the sake of facile space filling, the desulfurizer can be formed of support blocks impregnating the desulfurizing catalyst. Further, And also it is preferable that an amount of the desulfurizing catalyst impregnated in the support is properly controlled according to an amount of the reformed gas introduced into the desulfurizer and the like.

The post-reformer 30 is provided with a post-reforming catalyst formed of a transition metal, a noble metal or a mixture thereof, and thus the low carbon hydrocarbon material of $C_2$~$C_5$ is decomposed into hydrogen and methane by the post-reforming catalyst. In detail, by the post-reforming catalyst, the low carbon hydrocarbon material of $C_2$~$C_5$ is reacted with hydrogen and vapor contained in the desulfurized reformed gas introduced into the post-reformer so as to be selectively decomposed into hydrogen and methane. Preferably, the transition metal of the post-reforming catalyst includes Ni, Mg and a mixture thereof, and the noble metal thereof includes Pt, Rh, Pd, Ru and a mixture thereof.

Like the primary-reformer or the desulfurizer, the post-reformer can be formed of a porous support (including a support having through-pores along a fluid conveying direction) through which the fluid is passed and which impregnates the post-reforming catalyst, or a mixture of the post-reforming catalyst and an alumina-based, silica-based and ceria-based material which can be used as the support. For the sake of facile space filling, the post-reformer can be formed of support blocks impregnating the post-reforming catalyst, or blocks of the mixtures. Further, And also it is preferable that an amount of the post-reforming catalyst impregnated in the support is properly controlled according to an amount of the reformed gas introduced into the post-reformer and the like.

As shown in FIG. 1 and FIG. 2, the reaction heat generated in the primary-reformer and the desulfurizer is used as a heat source for the post-reforming operation, and thus the reaction in the post-reformer can be performed without the external heat.

Except the fluid moving passage, the post-reformer 130 in which an endothermic reaction occurs is adjacent to the primary-reformer 110 at one side thereof, while the partition wall is disposed therebetween, and also adjacent to the desulfurizer 120 at the other side thereof, while the partition wall is disposed therebetween. Therefore, the post-reformer can receive the heat from both of the primary-reformer 110 and the desulfurizer 120 to be heated, so that an exothermic reaction can be performed, i.e., the low carbon hydrocarbon of $C_2$~$C_5$ can be selectively decomposed into hydrogen and methane.

At this time, the hydrocarbon-based fuel and water are vaporized by the heat generated in the reforming reaction of the primary-reformer, and finally the hydrogen-rich reformed gas can be obtained. As described above with reference to FIG. 1, in order to increase the reforming efficiency, the injection nozzle is preferably provided at the external fluid inlet port which is disposed at the upper portion of the primary-reformer.

In the primary-reformer, the reforming reaction can be continuously performed by the reaction heat generated in the reaction without external heat, and also in the desulfurizer, the desulfurizing reaction can be continuously performed by the reaction heat generated in the reaction without external heat.

In the post-reformer, since the heat generated in the primary-reformer and the desulfurizer is supplied through the internal partition walls and also the desulfurized reformed gas having a high temperature is introduced, the heat which is necessary to decompose the low carbon hydrocarbon is continuously supplied.

Preferably, by using a volume of the primary-reformer, a volume of the post-reformer, a volume of the desulfurizer, a contacted surface area between the primary-reformer and the post-reformer through the internal partition wall, a contacted surface area between the desulfurizer and the post-reformer through the internal partition wall, a thickness of the internal partition wall, a material of the internal partition wall, a fluid moving distance until the gas discharged from the desulfurizer is introduced into the post-reformer, a fluid moving distance until the gas discharged from the post-reformer is introduced into the desulfurizer, an amount of the fuel, air or water introduced into the primary-reformer, a mixed ratio of the fuel, air or water introduced into the primary-reformer, or a combination thereof, it is possible to properly control each temperature of the primary-reformer, the desulfurizer and the post-reformer in the normal driving state (wherein a series of processes that the water, air and fuel are supplied to the primary-reformer of the reactor are supplied to the primary-reformer and then the post-reformed gas of the post-reformer is finally discharged through the internal fluid outlet port) considering a reforming process rate of the reactor, a dimension of the reactor and the like.

Preferably, the temperature of the post-reformer is maintained at 300~600° C. In order to select the preferable temperature for the post-reformer, components of the gas reformed by only the primary-reformer were analyzed and then the gas reformed by the same primary-reformer was reformed again by a post-reformer similar to the above-mentioned post-reformer while the post-reformer is maintained at various temperatures so as to estimate a post-reforming effect. As a result, it was found that the gas discharged from the primary-reformer contained the low carbon hydrocarbon compound, and also the low carbon hydrocarbon compound could be completely removed by the post-reformer maintained at 300~600° C.

Speaking more detailedly, a model diesel synthetic fuel was introduced into the primary-reformer which had a ceria-based support impregnating Pt of 0.5 weight % and was maintained at 800° C., and then the reformed gas and the gas discharged from the primary-reformer were introduced into the post-reformer which was provided with alumina (13.5 weight %), silica (18.2 weight %), Ni (55.3 weight %) and Mg (13 weight %) and was maintained at 300~600° C., and then the gas discharged from the post-reformer was analyzed. The results are shown in FIGS. 3 and 4, wherein 'reformer+post-reformer' shows the results of analyzing the reformed gas using the reformer and the post-reformer in various temperature ranges.

Figure 3:
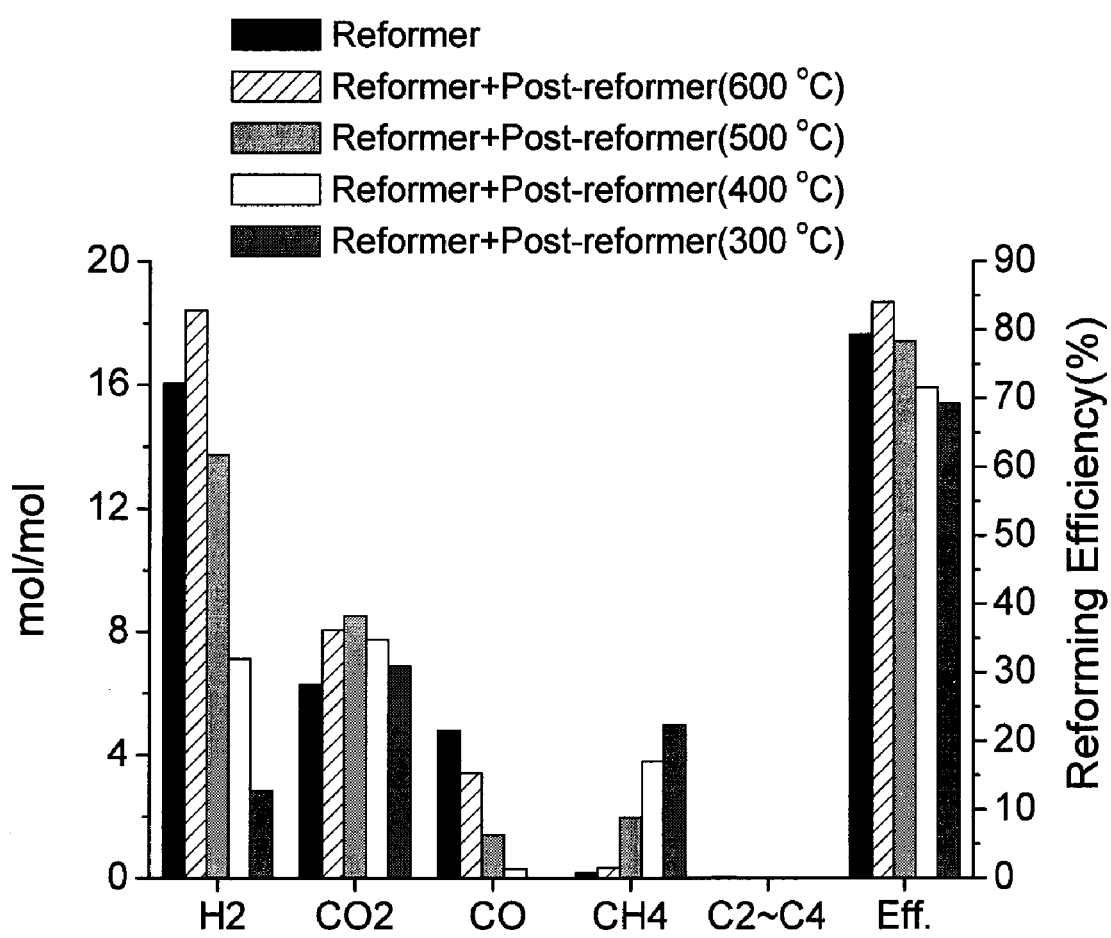
FIG. 3 is a graph showing results of analyzing reformed gas of a model diesel synthetic fuel through a reformer and reformed gas of a model diesel synthetic fuel through a reformer and a post-reformer.
Figure 4:
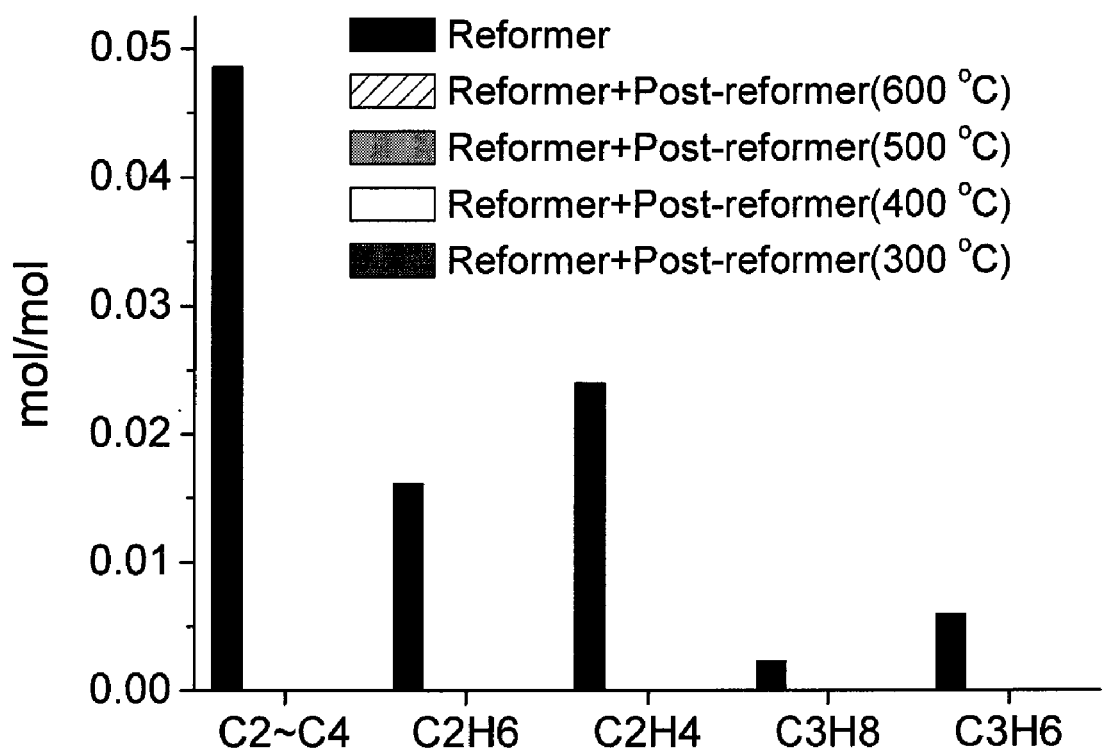
FIG. 4 is a graph showing the more detailed results of FIG. 3.

FIGS. 3 and 4 show concentrations of the gases obtained by reforming the model diesel synthetic fuel. As shown in FIGS. 3 and 4 comparing the generated gas using only the reformer and the generated gas using the reformer and the post-reformer, hydrogen-rich gas can be obtained from the generated gas obtained by using the reformer but the generated gas contains the non-converted low carbon hydrocarbon material ($C_2$~$C_4$) which exerts a bad effect on the performance of the SOFC. However, in case of operating the reformer together with the post-reformer, as shown in FIG. 4, the non-converted low carbon hydrocarbon material can be completely removed in the entire operational temperature range of the post-reformer. Therefore, it can be confirmed that the non-converted low carbon hydrocarbon material generated from the reformer can be completely and effectively removed by using the post-reformer.

Meanwhile, it can be also confirmed that, as the operational temperature of the post-reformer is lowered, a concentration of hydrogen in the generated gas is reduced and thus the performance of the reformer is deteriorated. This is quantitatively shown by the reforming efficiency of FIG. 3. Therefore, in order to remove the non-converted hydrocarbon material by using the post-reformer and also improving the reforming efficiency, it is preferable that the operational temperature of the post-reformer is 500~600° C. In case that the operational temperature of the post-reformer is 500~600° C., it can be possible to completely remove the low carbon hydrocarbon material discharged from the reformer and also to obtain the reforming efficiency which is similar to or slightly larger than the efficiency when using only the reformer.

Figure 5:
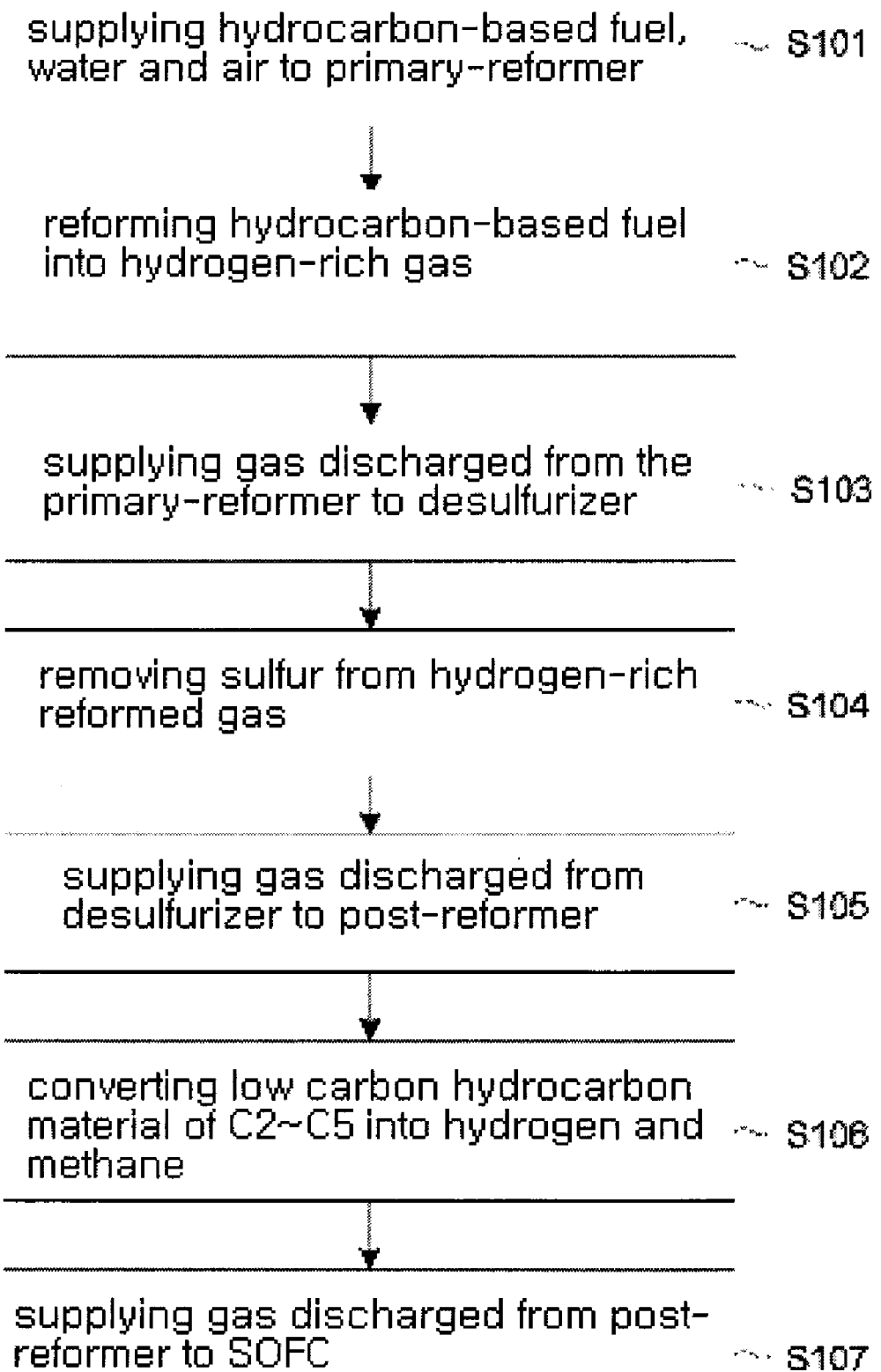
FIG. 5 is a flow chart of a fuel processing method using the unified fuel processing reactor for a solid oxide fuel cell according to the present invention.

FIG. 5 is a flow chart showing a fuel processing method using the reactor according to the present invention, As shown in FIG. 5, the fuel processing method using the reactor of the present invention preferably includes the steps of supplying water, hydrocarbon-based fuel and air to the primary-reformer 110 which reforms the hydrocarbon-based fuel to generate hydrogen-rich reformed gas (S101), reforming the hydrocarbon-based fuel using the reformer 110 (S102), supplying the reformed gas discharged from the reformer 110 to a desulfurizer 120 which removes a sulfur component (S103), desulfurizing the reformed gas in the desulfurizer 120 (S104), supplying gas discharged from the desulfurizer 120 to the post-reformer 130 (S105), and selectively decomposing non-converted (non-reformed) hydrocarbon-based fuel (low carbon hydrocarbon material of $C_2$~$C_5$) into hydrogen and methane in the post-reformer 130 (S106). The gas discharged from the post-reformer 130 is supplied to the SOFC cell (stack) 40 (S107).

Preferably, in the process of the step S101, the water, the hydrocarbon-based fuel and the air are supplied through the injection nozzle 101 to the reformer, and the primary-reformer may be further provided with a separate water supplying line besides the injection nozzle.

INDUSTRIAL APPLICABILITY

According to the present invention, since the unified fuel processing reactor for a solid oxide fuel cell of the present invention can selectively remove the low carbon hydrocarbon, it is possible to prevent the deterioration of performance of the SOFC system and to increase the stability of the SOFC system (the fuel cell) for a long time period. And since the reforming operation, the desulfurizing operation and the selectively decomposing operation of the non-converted low carbon ($C_2$~$C_5$) hydrocarbon are performed in a single reactor, it is possible to increase the stability of the SOFC system and to simplify and miniature the SOFC system, and also it can be thermally independent without the external heat.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A unified fuel processing reactor for a solid oxide fuel cell, comprising:
    a primary-reformer for reforming a hydrocarbon-base fuel and generating hydrogen-rich reformed gas;
    a desulfurizer downstream of the primary-reformer for removing a sulfur component from the reformed gas; and
    a post-reformer connected with and downstream of the dusulfurizer for selectively decomposing a low carbon ($C_2$~$C_5$) hydrocarbon compound contained in a desulfurized reformed gas into hydrogen and methane,
    wherein the primary-reformer, the desulfurizer and the post-reformer are in the unified reactor and isolated from each other by internal partition walls except a passage for conveying fluid, and
    the primary-reformer being at a center portion of the reactor, and the post-reformer and the desulfurizer are concentrically disposed in turn outside of the primary-reformer.

2. The unified fuel processing reactor as set forth in claim 1, wherein an external fluid inlet port is at an upper side of the primary-reformer, and a lower portion of the primary-reformer communicates with a lower portion of the desulfurizer, and an upper portion of the desulfurizer communicates with an upper portion of the post-reformer, and a lower portion of the post-reformer is closed by an internal partition wall, and an internal fluid outlet port is at a lower side of the post-reformer.

3. The unified fuel processing reactor as set forth in claim 2, wherein the reactor has a cylindrical or polyhedral shape, and the primary-reformer has a circular, elliptical or polygonal cross-sectional shape, and the post-reformer and the desulfurizer respectively have a ring-shape, an elliptical ring-shape and a polygonal band shape.

4. The unified fuel processing reactor as set forth in claim 3, wherein the post-reformer is arranged to be heated by reforming reaction heat of the primary-reformer and desulfurizing reaction heat of the desulfurizer.

* * * * *